(12) United States Patent
Samaras et al.

(10) Patent No.: US 11,845,599 B2
(45) Date of Patent: *Dec. 19, 2023

(54) CONTAINER CARRIER

(71) Applicant: ILLINOIS TOOL WORKS INC., Glenview, IL (US)

(72) Inventors: Peter L. Samaras, Woodstock, IL (US); Rachell L. Slovik, Bartlett, IL (US); Patrick R. Van Tholen, Lombard, IL (US)

(73) Assignee: Illinois Tool Works Inc., Glenview, IL (US)

( * ) Notice: Subject to any disclaimer, the term of this patent is extended or adjusted under 35 U.S.C. 154(b) by 519 days.

This patent is subject to a terminal disclaimer.

(21) Appl. No.: 16/741,149

(22) Filed: Jan. 13, 2020

(65) Prior Publication Data

US 2020/0223608 A1 Jul. 16, 2020

Related U.S. Application Data

(60) Provisional application No. 62/792,264, filed on Jan. 14, 2019.

(51) Int. Cl.
| | |
|---|---|
| *B65D 71/50* | (2006.01) |
| *C08L 23/06* | (2006.01) |
| *C08L 23/08* | (2006.01) |
| *C08K 5/01* | (2006.01) |

(52) U.S. Cl.
CPC .............. *B65D 71/504* (2013.01); *C08K 5/01* (2013.01); *C08L 23/06* (2013.01); *C08L 23/0815* (2013.01); *C08L 2205/02* (2013.01); *C08L 2205/03* (2013.01); *C08L 2207/066* (2013.01); *C08L 2207/20* (2013.01); *C08L 2314/06* (2013.01)

(58) Field of Classification Search
CPC .................................................... B65D 71/504
See application file for complete search history.

(56) References Cited

U.S. PATENT DOCUMENTS

| | | | | |
|---|---|---|---|---|
| 4,740,415 A * | 4/1988 | Hirschberger | ...... | C08L 23/0815 206/150 |
| 5,552,198 A * | 9/1996 | Hiltner | ..... | B32B 27/08 206/524.1 |
| 7,195,809 B2 * | 3/2007 | Weaver | ..... | B65D 71/504 206/145 |
| 7,510,074 B2 * | 3/2009 | Weaver | ..... | B65D 71/504 294/87.2 |
| 2002/0011423 A1 | 1/2002 | Weaver | | |
| 2004/0147679 A1 | 7/2004 | Weaver et al. | | |
| 2004/0192850 A1* | 9/2004 | Weaver | ..... | B65D 71/504 525/240 |
| 2012/0227361 A1* | 9/2012 | Bates | ..... | B65B 17/025 206/145 |
| 2013/0186573 A1* | 7/2013 | Kulesa | ..... | B29B 17/0026 156/701 |
| 2017/0043924 A1* | 2/2017 | Bates | ..... | B65D 71/504 |
| 2018/0016750 A1 | 1/2018 | Lauria et al. | | |
| 2019/0062017 A1 | 2/2019 | Singh | | |
| 2021/0214537 A1* | 7/2021 | Samaras | ..... | B65D 71/504 |

FOREIGN PATENT DOCUMENTS

| | | |
|---|---|---|
| CN | 1249265 A | 4/2000 |
| CN | 1557684 A | 12/2004 |
| CN | 102648135 A | 8/2012 |
| CN | 103221309 A | 7/2013 |
| CN | 106660645 A | 5/2017 |
| EP | 1 440 902 A1 | 7/2004 |
| GB | 2475622 A | 5/2011 |
| GB | 2485895 A | 5/2012 |
| JP | 4615871 B2 | 1/2011 |
| WO | 2001043962 A1 | 6/2001 |
| WO | 2011051472 A1 | 5/2011 |
| WO | 2013019834 A1 | 2/2013 |
| WO | WO 2019/240899 A1 | 12/2019 |
| WO | WO 2020/049366 A1 | 3/2020 |
| WO | WO 2020/084353 A1 | 4/2020 |
| WO | WO 2020/229932 A1 | 11/2020 |
| WO | WO 2021/067534 A1 | 4/2021 |
| WO | WO 2021/074698 A1 | 4/2021 |

OTHER PUBLICATIONS

European Patent Office, English language version of the International Search Report, Form PCT/ISA/210 for International Application PCT/US2020/013489, dated May 12, 2020 (4 pages).

(Continued)

*Primary Examiner* — Irina Krylova
(74) *Attorney, Agent, or Firm* — Maxwell J. Petersen; FisherBroyles, LLP

(57) ABSTRACT

A flexible carrier for carrying a plurality of containers, such as soft drink and other beverage containers, is formed from a polymer composition which provides the carrier with improved recovery, tensile strength and tear resistance. The polymer composition includes about 40-60% by weight of a low density ethylene polymer having a density of about 0.910-0.950 grams/cm3 and about 40-60% by weight of a post-consumer recycled product blend of low density polyethylene polymer and linear low density polyethylene polymer.

16 Claims, 1 Drawing Sheet

(56) References Cited

OTHER PUBLICATIONS

European Patent Office, English language version of the Written Opinion of the ISA, Form PCT/ISA/237 for International Application PCT/US2020/013489, dated May 12, 2020 (6 pages).
EPO Communication Pursuant to Rule 114(2) EPC—Third Party Observations—European Patent Application No. 20704715.0 (12 pages).
Form PCT/IB/345 for PCT International No. PCT/US2020/013489 Communication In Cases for Which no Other Form Is Applicable (1 page).
Third Party Observations re: International Application No. PCT/US2020/013489, International Publication No. WO 2020/150219 A1 for Applicant: Illinois Tool Works Inc., May 14, 2021 (3 pages).

* cited by examiner

CONTAINER CARRIER

CROSS REFERENCE TO RELATED APPLICATION

This application claims the benefit of U.S. Provisional Application, Ser. No. 62/792,264, filed on 14 Jan. 2019. This U.S. Provisional Application is hereby incorporated by reference herein in its entirety and are made a part hereof, including but not limited to those portions which specifically appear hereinafter.

BACKGROUND OF THE INVENTION

Field of the Invention

This invention relates to a container carrier having container receiving apertures for unitizing a plurality of containers.

Description of Prior Art

Conventional container carriers are often used to unitize a plurality of similarly sized containers, such as cans, bottles, jars and boxes and/or similar containers that require unitization. Flexible plastic ring carriers are one such conventional container carrier.

Flexible plastic ring carriers having a plurality of container receiving apertures, typically of a generally oval, round or rectangular configuration, that each engage a corresponding container may be used to unitize groups of four, six, eight, twelve or other suitable groups of containers into a convenient multipackage.

There is interest in increasing use of post-consumer recycled ("PCR") content to manufacture a carrier. However, a carrier that includes such post-consumer recycled content must still create a sturdy and aesthetically pleasing package that meets performance parameters without breakage, sag at the ends or danger of container loss. Such a carrier must also withstand the rigors of high speed application to containers. Further, such a carrier must meet rigorous photodegradability standards. As such, a need arises for a carrier that includes post-consumer recycled content and is capable of carrying a large number of containers that permits high speed application and results in an aesthetically pleasing package for the consumer to handle.

SUMMARY OF THE INVENTION

The present invention is directed to a flexible carrier for packaging containers that includes an arrangement of container receiving apertures that are configured to permit placement over containers and permit carrying a unitized package of containers.

The carrier is suitably configured with a combination of webs and container receiving apertures that permit opening up and generally even, distributed stretching for application to the containers. Traditional carriers typically include generally oval, round, rectangular or triangular shaped container receiving apertures.

The subject invention is directed to a container carrier that includes an arrangement of container receiving apertures and intermediate cutouts. The resulting carrier is configured to enable placement over corresponding containers to result in a tight, unitized bricklike package.

The present invention is directed to a flexible carrier for containers, which incorporates post consumer recycled material with convention material and still maintains desired recovery after stretch, suitable elongation at break, and desirable photodegradability properties. The flexible carrier is formed using a polymer blend which preferably includes the following components:

a) about 30-80% by weight of a low density polyethylene polymer including about 80 to 100% by weight ethylene;

b) about 20-70% by weight of a post-consumer recycled product blend of low density polyethylene polymer and linear low density polyethylene polymer; and c) one or more other additives for improving manufacture and/or post-consumer characteristics such as degradation.

Additives may include slip agents and other processing aids for enhancing extrusion and/or die-cutting. Additives may include compounds for improving or aiding degradation including photodegradation such as 0 to about 20% by weight of a carbon monoxide comonomer for enhancing photodegradation.

The flexible carrier includes a plastic sheet formed using the polymer blend, and including a plurality of openings for surrounding and holding the containers. Each opening is surrounded by a portion of the flexible carrier defined as a container engaging portion.

BRIEF DESCRIPTION OF THE DRAWINGS

The above-mentioned and other features and objects of this invention will be better understood from the following detailed description taken in conjunction with the drawings wherein.

DESCRIPTION OF PREFERRED EMBODIMENTS

Figure 1:
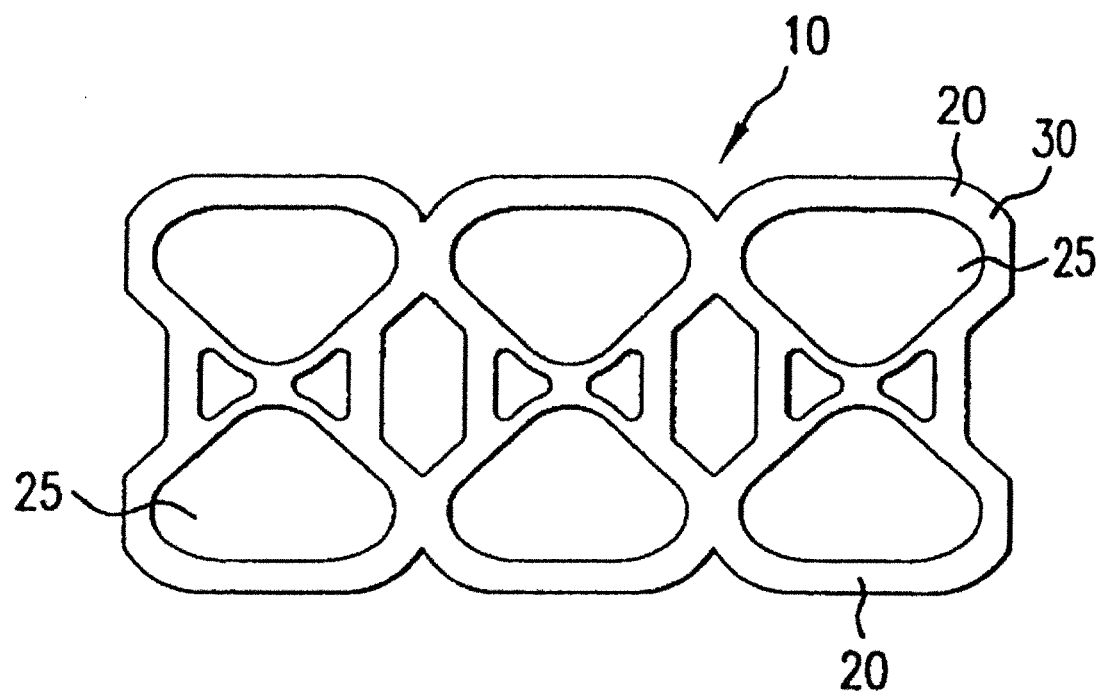
FIG. 1 is a side elevational view of a container carrier according to one preferred embodiment of this invention.

FIG. 1 shows a flexible carrier 10 for unitizing multiple containers into a resulting unitized package. Although FIG. 1 illustrates a carrier having six container receiving apertures 25, the illustration is exemplary, and the invention is not limited to the flexible carrier shown for six containers. For example, the flexible carrier 10 may be alternatively configured and used to unitize four, eight, ten, twelve, or any other desired number of containers.

Containers are preferably cans or bottles, however any other commonly unitized container may be used with flexible carrier 10 according to this invention. The containers are preferably, though not necessarily, like-sized within a single flexible carrier.

Each flexible carrier 10 preferably includes a single layer of flexible sheet 20 having a width and length defining therein a plurality of container receiving apertures 25, each for receiving a container. The plurality of container receiving apertures are preferably arranged in two longitudinal rows and multiple longitudinal ranks so as to form an array of container receiving apertures, such as two rows by three ranks for a six container multipackage as shown in FIG. 1. Container receiving apertures 25 are preferably generally slightly elongated in a longitudinal direction of flexible carrier.

A representative package resulting from flexible carrier includes a plurality of unitized containers. Flexible carriers 10 are generally applied to containers by stretching flexible sheet surrounding container receiving apertures around container, and requiring the stretched carrier to recover, thereby providing a tight engagement.

Preferably, the flexible carriers 10, such as shown in FIG. 1, are manufactured in a generally continuous string of carriers wherein carriers are punched or otherwise formed longitudinally adjacent to other carriers. In this manner, a generally continuous string of carriers is formed that may be rolled onto reels or folded into boxes for later unwinding and application to containers. The carriers are then cut into individual carriers and packages.

Container receiving apertures and intermediate apertures are preferably formed in a geometry that results in a uniform application of the carrier to containers to produce a tight unitization of containers within flexible carrier. Such a result is difficult when material within the flexible carrier is minimized as shown and described herein.

The containers to be inserted in the container receiving apertures 25 may be bottles or cans having varying shapes and diameters. Referring to FIG. 1, for instance, each flexible carrier 10 is installed on containers by stretching the carrier receiving portions 30 in the cross direction, in opposing fashion. The carrier receiving portions 30 are installed around the containers while stretched, and are allowed to retract (recover) to provide a snug fit around the rib, chime or outside surface of the containers. The strength of that snug fit will be impacted, in part, by the modulus of the flexible sheet 20 used to construct the flexible carrier 10. The plan view dimensions of the flexible carrier 10, and its components, vary according to the end use. Particular end uses include without limitation soft drink and beverage cans and bottles of various sizes and shapes.

The flexible sheet 20 used to form the flexible carrier 10 is desirably a plastic film, which can be formed by an extrusion process and then cut to form the flexible carrier. The flexible sheet 20 has a thickness which provides sufficient structural integrity to carry a desired number of containers. For instance, each flexible carrier 10 may be designed to carry multiple containers of a desired product having a specific weight, volume, shape and size. For most applications, the flexible sheet 20 may have a thickness of about 3-50 mils, suitably about 5-30 mils, commonly about 10-20 mils.

The flexible sheet 20 used to form the flexible carrier 10 is formed using a polymer composition which includes a high pressure low density polyethylene polymer and a post-consumer recycled product blend of low density polyethylene polymer and linear low density polyethylene polymer. The composition provides the carrier 10 with a desirable recovery after stretch, suitable elongation and strength at break, compared to an otherwise similar carrier made using the high pressure low density polyethylene polymer alone. Elongation at break and strength at break are measured using the stress-strain test described in ASTM D882-91, which procedure is incorporated by reference. Recovery after stretch can be measured using various standard and specialized procedures.

The polymer blend used to form the flexible carrier includes about 30-80% by weight of a low density polyethylene polymer including about 80 to 100% by weight ethylene and 0 to about 20% by weight of a carbon monoxide comonomer. Desirably, this polymer is branched, and is prepared using a conventional high pressure polymerization process. The low density polyethylene polymer may be prepared using a Ziegler-Natta catalyst or a single-site catalyst system. The low density polyethylene polymer may be a homopolymer, or a copolymer of ethylene with one or more C3 to C12 alpha-olefin comonomers and/or carbon monoxide. Desirably, the low density polyethylene polymer includes a carbon monoxide comonomer, which makes the carrier more prone to degradation in the presence of ultraviolet light. Suitably, the polymer blend includes about 70-97% by weight of the low density polyethylene polymer, desirably about 80-95% by weight of the low density polyethylene polymer.

The desired amount of carbon monoxide comonomer in the low density polyethylene polymer varies depending on the percentage of the low density polyethylene polymer in the polymer blend composition. When present, the carbon monoxide comonomer may constitute about 0.1-20% by weight of the low density polyethylene polymer. When considered as a percentage of the polymer blend composition, the carbon monoxide comonomer may constitute about 0.1-10% by weight.

The low density polyethylene polymer should have a density of about 0.910-0.950, grams/cm3, suitably about 0.920-0.940 grams/cm3, desirably about 0.920-0.935 grams/cm3. In other words, the term "low density polyethylene polymer" includes polyethylene polymers commonly considered as having medium density, as well as polyethylene polymers commonly considered as having low density. The low density polyethylene polymer should have a melt index of about 0.2-3.0 grams/10 min., suitably about 0.3-1.5 grams/10 min., desirably about 0.4-0.7 grams/10 min., measured at 190° C. using ASTM D1238.

The polymer blend used to form the flexible carrier also includes about 20-70% by weight of a low density polyethylene polymer post-consumer recycled product. More preferably, the polymer blend includes 40-60% by weight of a post-consumer recycled product blend of low density polyethylene polymer and linear low density polyethylene polymer. The following table lists exemplary combinations of low density polyethylene polymer post-consumer recycled material useful to form the flexible carrier composition of the invention.

Flexible Carrier Compositions

I. 40-60% by weight ethylene-carbon monoxide copolymer, having a density of 0.925-0.931 grams/cm3, a melt index (190° C.) of 0.42-0.62 grams/10 min., II. 40-60% by weight of a post-consumer recycled product blend of low density polyethylene polymer and linear low density polyethylene polymer having the following qualities:

| Property | Unit | Nominal Value | ASTM Test Method |
|---|---|---|---|
| Relative Density | g/cm3 | 0.920-0.935 | D792 |
| Melt Flow Rate (AVG) | g/10 min. | 0.5-1.5 | D1238 |
| Ash Content | % | =<2.5 | D4218 |
| Moisture Content | % | =<0.05 | D6980 |
| Pellet Size | Mm | 4.5-5.5; | | and

III. 0-10% additives.

Figure 2:
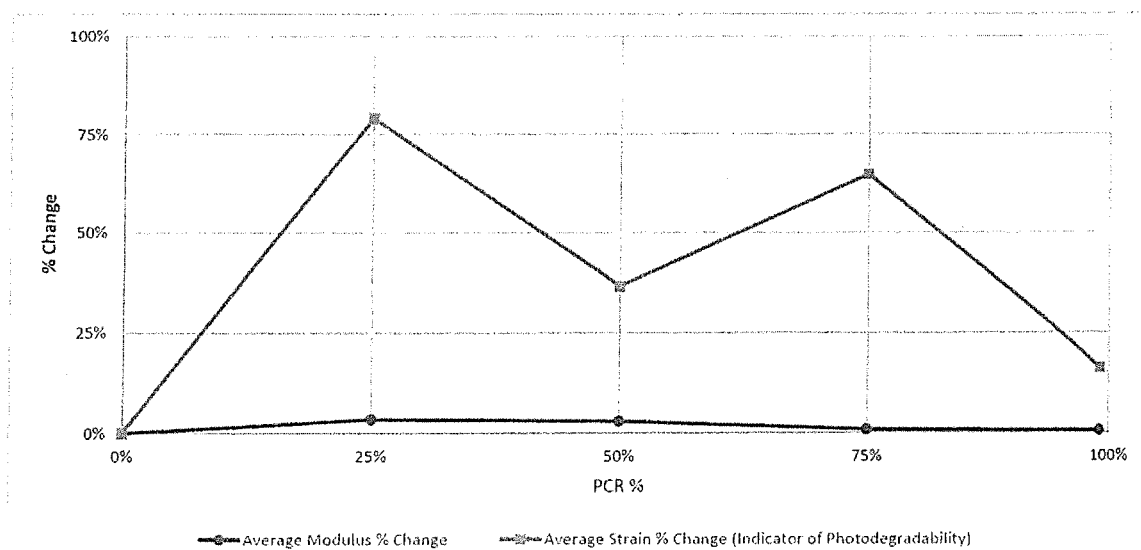
FIG. 2 is a chart showing modulus change and strain change across five different compositions of a container carrier material.

As shown in FIG. 2, the combination of the ethylene-carbon monoxide copolymer and the post-consumer recycled material may result in desirable property characteristics up to about 65% by weight of the post-consumer recycled content. As shown, photodegradability improves at 25% PCR content where it begins to decrease through 50% PCR content and become worse at about 65% by weight PCR. Likewise, recovery and modulus remain fairly consistent between 0 and 25% PCR content where recovery begins to decrease as PCR percent increases. The PCR material is preferably generally clear/translucent and not opaque/dark.

The polymer blend composition used in the flexible carrier includes two primary polymer components as described above in the stated percentage ranges, with or without other polymer components, provided that the important physical properties of the flexible carrier described above are substantially maintained. For instance, the ethylene-carbon monoxide copolymer which destabilizes the carrier against ultraviolet radiation may be provided separately, in the form of a masterbatch or concentrate having a higher carbon monoxide content, or some or all of the carbon monoxide may be copolymerized with the single-site catalyzed ethylene alpha olefin plastomer. Other polymers may also be added in amounts which substantially maintain or enhance the recovery, elongation, modulus, tensile strength, and tear resistance of the flexible carrier, and/or which provide the carrier with cold temperature resistance, stress crack resistance, enhanced clarity and other desirable properties. The polymer components may be dry blended and/or melt blended together. Typically, they are fed separately to the extruder which forms the flexible carrier sheet, and are melt blended in the extruder.

According to one preferred embodiment of the invention, the 40-60% by weight of a post-consumer recycled product blend of low density polyethylene polymer and linear low density polyethylene polymer may comprise quantifiable amounts of propylene, Butene, LDPE, Hexene, Styrene and LLDPE (linear low-density polyethylene). Examples of specific batches of material are listed in the following table.

| Sample # | wt % PP (as propylene) | wt % Butene | wt % Hexene (includes some LDPE) | Approximate wt % LDPE | wt % Styrene | Approximate wt % LLDPE |
|---|---|---|---|---|---|---|
| 1 | 1.8 | 2.2 | 4.4 | 50 | 0.05 | 45 |
| 2 | 2.3 | 2.0 | 4.4 | 45 | 0.15 | 45 |
| 3 | 1.7 | 2.6 | 3.8 | 53 | 0.29 | 38 |

In one embodiment of the invention, the composition preferably includes an additive for assisting in the degradability of the subject carrier. In one embodiment, such degradability is photodegradable and may include the introduction of carbon monoxide such that the polymer blend should have a carbon monoxide content of about 0.1-10% by weight.

According to one preferred embodiment, a single-site catalyzed ethylene-alpha olefin copolymer plastomer may be further included to enhance recovery and modulus characteristics of the flexible carrier 10. The plastomer preferably includes a density of about 0.850-0.905 grams/cm3. Suitable single-site catalyzed ethylene-alpha olefin copolymer plastomers may include metallocene and may also include plastomers available from Exxon-Mobil Chemical Co. under the trade name EXACT, and from Dow Chemical Co. under the trade names AFFINITY and ENGAGE.

Other additives that may comprise 0-10% of the composition of the container carrier may include slip agents and other processing aids for enhancing extrusion and/or die-cutting. One such additive may comprise a fluorinated processing aid, such as KYNAR FLEX 5300 manufactured by Arkema, that comprises approximately 0.25% of the composition. Other additives may include an antiblock, antioxidant, and slip to adjust the composition to accommodate the stretch and recovery characteristics required in the finished container carrier.

While in the foregoing specification this invention has been described in relation to certain preferred embodiments thereof, and many details have been set forth for purpose of illustration, it will be apparent to those skilled in the art that flexible carrier 10 is susceptible to additional embodiments and that certain of the details described herein can be varied considerably without departing from the basic principles of the invention.

The invention claimed is:

1. A flexible carrier for carrying a plurality of containers, consisting of a flexible sheet, the flexible sheet including a plurality of primary apertures having only convex edges formed in the sheet for receiving portions of the containers by stretching the flexible carrier surrounding the primary apertures around the containers and allowing the flexible carrier surrounding the primary apertures to recover, thereby providing a tight engagement with the containers within the primary apertures, the flexible sheet comprising a polymer composition which includes:

about 30-80% by weight of a branched low density polyethylene polymer including about 80 to 99.5% by weight ethylene and 0.5 to about 20% by weight of a carbon monoxide comonomer, the branched low density polyethylene polymer having a density of about 0.910 to 0.935 grams/cm$^3$ and a melt flow rate of about 0.2 to about 3.0 crams/10 min and prepared using a high pressure polymerization process;

about 20-70% by weight of a post-consumer recycled product blend that includes about 45% to about 53% by weight of a post-consumer recycled low density polyethylene polymer and about 38% to about 45% by weight of a post-consumer recycled linear low density polyethylene polymer, the post-consumer recycled product blend including at least about 90% combined weight of the post-consumer recycled low density polyethylene polymer and the post-consumer recycled linear low density polyethylene polymer and the blend having a density of about 0.920 to about 0.935 grams/cm$^3$ and a melt flow rate of about 0.5 to about 1.5 grams/10 min; and optionally, about 0-10% by weight of other additives;

wherein the flexible carrier is capable of receiving and carrying from four to twelve of the containers in tight engagement within the primary apertures without breakage of the flexible carrier or loss of the containers.

2. The flexible carrier of claim 1, wherein the branched low density polyethylene polymer further comprises another alpha-olefin comonomer.

3. The flexible carrier claim 2, wherein the alpha-olefin comonomer comprises at least one of Propylene, Butene, Hexene and Styrene.

4. The flexible carrier of claim 1 further comprising an additive that results in photodegradability.

5. The flexible carrier of claim 1, comprising not less than four and not more than eight of the primary apertures.

6. The flexible carrier of claim 1, wherein the branched low density polyethylene polymer has a density of about 0.920-0.935 grams/cm3.

7. The flexible carrier of claim 1, wherein the other additives comprise a single-site catalyzed ethylene-alpha olefin copolymer plastomer having a density of about 0.850-0.905 grams/cm3.

8. The flexible carrier of claim 7, wherein the single-site catalyzed ethylene-alpha olefin copolymer plastomer comprises an alpha-olefin comonomer having 3-12 carbon atoms.

9. The flexible carrier of claim 8, wherein the alpha-olefin comonomer has 4-8 carbon atoms.

10. The flexible carrier of claim 1, wherein the polymer composition comprises about 40-60% by weight of the branched low density polyethylene polymer and about 40-60% by weight of the post-consumer recycled product blend, without substantial loss of mechanical properties from a flexible carrier without post-consumer recycled product.

11. The flexible carrier of claim 1, wherein the branched low density polyethylene polymer comprises about 0.5 to about 10% by weight of the carbon monoxide comonomer.

12. A flexible carrier for carrying a plurality of containers, consisting of a flexible sheet, the flexible sheet including a plurality of primary apertures having only convex edges formed in the sheet for receiving portions of the containers by stretching the flexible carrier surrounding the primary apertures around the containers and allowing the flexible carrier surrounding the primary apertures to recover, thereby providing a tight engagement with the containers within the primary apertures, the flexible sheet comprising a polymer composition which includes:
    about 40-60% by weight of a branched low density polyethylene polymer including about 80 to 99.5% by weight ethylene and 0.5 to about 20% by weight of a carbon monoxide comonomer, the branched low density polyethylene polymer having a density of about 0.910 to 0.935 grams/cm$^3$ and a melt flow rate of about 0.2 to about 3.0 grams/10 min and prepared using a high pressure polymerization process;
    about 40-60% by weight of a post-consumer recycled product blend that includes about 45% to about 53% by weight of a post-consumer recycled low density polyethylene polymer and about 38% to about 45% by weight of a post-consumer recycled linear low density polyethylene polymer, the post-consumer recycled product blend including at least about 90% combined weight of the post-consumer recycled low density polyethylene polymer and the post-consumer recycled linear low density polyethylene polymer and the blend having a density of about 0.920 to about 0.935 grams/cm$^3$ and a melt flow rate of about 0.5 to about 1.5 grams/10 min; and
    optionally, about 0-10% by weight of other additives;
    wherein the flexible carrier is capable of receiving and carrying from four to twelve of the containers in tight engagement within the primary apertures without breakage of the flexible carrier or loss of the containers.

13. The flexible carrier of claim 12, wherein the branched low density polyethylene polymer comprises about 0.5-10% by weight of the carbon monoxide comonomer.

14. A flexible carrier for carrying a plurality of containers, consisting of a flexible sheet, the flexible sheet including a plurality of primary apertures having only convex edges formed in the sheet for receiving portions of the containers by stretching the flexible carrier surrounding the primary apertures around the containers and allowing the flexible carrier surrounding the primary apertures to recover, thereby providing a tight engagement with the containers within the primary apertures, the flexible sheet comprising a polymer composition which includes:
    about 40-60% of a branched low density polyethylene polymer including about 80 to 99.5% by weight of ethylene and 0.5 to about 20% by weight of a carbon monoxide comonomer, the branched low density polyethylene polymer having a density of about 0.910 to 0.935 grams/cm$^3$ and a melt flow rate of about 0.2 to about 3.0 grams/10 min and prepared using a high pressure polymerization process;
    about 40-60% by weight of a post-consumer recycled product blend of that includes about 45% to about 53% by weight of a post-consumer recycled low density polyethylene polymer and about 38% to about 45% by weight of a post-consumer recycled linear low density polyethylene polymer, the post-consumer recycled product blend including at least about 90% combined weight of the post-consumer recycled low density polyethylene polymer and the post-consumer recycled linear low density polyethylene polymer and the blend having a density of about 0.920 to about 0.935 grams/cm$^3$ and a melt flow rate of about 0.5 to about 1.5 grams/10 min; and
    optionally, about 0-10% by weight of other additives;
    wherein the flexible carrier is capable of receiving and carrying from four to ten of the containers in tight engagement within the primary apertures without breakage of the flexible carrier or loss of the containers.

15. The flexible carrier of claim 14, wherein the branched low density polyethylene polymer has a density of about 0.925-0.931 grams/cm$^3$.

16. The flexible carrier of claim 14, wherein the branched low density polyethylene polymer has a melt index of about 0.42-0.62 grams/10 min.

* * * * *